Sept. 2, 1941.            J. D. McGEE              2,254,616
           MANUFACTURE OF GRIDS FOR USE IN ELECTRON DISCHARGE DEVICES
                              Filed Oct. 25, 1938

INVENTOR
JAMES D. MC GEE
BY
ATTORNEY

Patented Sept. 2, 1941

2,254,616

UNITED STATES PATENT OFFICE 2,254,616

MANUFACTURE OF GRIDS FOR USE IN ELECTRON DISCHARGE DEVICES

James Dwyer McGee, Ealing, London, England, assignor to Electric & Musical Industries Limited, Hayes, Middlesex, England, a company of Great Britain Application October 25, 1938, Serial No. 236,867
In Great Britain October 26, 1937

2 Claims. (Cl. 250—27.5)

This invention relates to the manufacture of grids for use in electron discharge devices.

In the specification of the United States patent to Lubszynski No. 2,227,097, issued December 31, 1940, a picture multiplier is disclosed in which an optical image is projected onto a photo-sensitive cathode the photo-electrons emitted by said cathode being accelerated and focussed onto a target electrode which is adapted to emit a large number of secondary electrons which are accelerated and focussed onto a mosaic screen, which is scanned by a beam of cathode rays, or onto a fluorescent screen. More than one target electrode may be employed, thereby affording more than one stage of electron multiplication. The target electrode is in the form of a grid and in one arrangement described in the aforesaid specification behind the target electrode and aligned therewith is a further electrode or subsidiary grid maintained at a positive potential with respect to the target electrode in order to draw the relatively slow-speed secondary electrons released from the target electrode through the apertures in the grid so that the secondary electrons are drawn into the accelerating and focussing fields for projection onto a further target electrode or onto the mosaic or fluorescent screen. In practice it is difficult to mount the subsidiary grid in alignment with the secondary emitting grid, and since the two grids must be disposed fairly close together it is difficult to ensure that the spacing between the grids is such as to prevent the possibility of the grids making electrical contact with one another.

In other forms of electron discharge devices it is sometimes necessary to cause a scanning beam of electrons to impinge on a conducting grid-like surface on the opposite side of which and insulated therefrom is formed a mosaic of mutually-insulated photo-electric elements. The scanning beam when impinging on the screen emits secondary electrons which are drawn through the apertures in the grid in order to discharge the mosaic elements, the mosaic elements acquiring a positive charge due, for example, to the projection thereon of an image, in television transmitting apparatus. In some cases the mosaic elements need not be photo-electrically active, in which case an electron image is projected onto the mosaic screen which is subsequently scanned, as described above. In other forms of electron discharge devices, such as in ordinary electron multipliers and other devices, it is sometimes desirable to provide two grids which must be maintained in alignment and insulated from one another and spaced at relatively small distances apart.

It is the object of the present invention to provide an improved grid structure suitable for use in the above-mentioned devices and a method of manufacturing such structure, the resultant structure affording effectively two grids disposed in alignment.

According to the invention a grid structure suitable for use in an electron discharge device is provided comprising a grid of conducting material having on one side thereof a coating of insulating material and a coating of conducting material on said insulating material. With such an arrangement two conducting grids are effectively formed separated from one another, by the layer of insulation, the two grids being accurately aligned and disposed in close proximity to one another. Preferably, the insulating coating is applied by evaporating an insulating material onto the grid and the coating of conducting material which is applied thereto to form the other grid is also applied by evaporation of a suitable metal, such as silver. The layer of conducting material may serve to constitute or form a mosaic screen as hereinafter referred to.

In order that the said invention may be clearly understood and readily carried into effect the same will now be more fully described with reference to the accompanying drawing in which.

Figure 1:
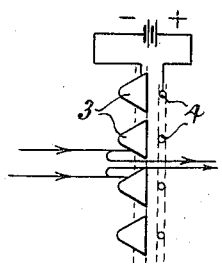
Figure 1 illustrates a known form of grid arrangement.
Figure 2:
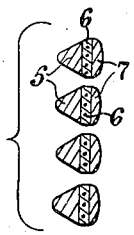
Figure 2 is a transverse sectional view of a grid constructed in accordance with the invention and suitable for use in the arrangement shown in Figure 1.

The construction shown in Figure 1 is suitable for use in a picture multiplier of the kind referred to in the specification of the above referred to United States Patent No. 2,227,097. The grid structure 3 forms a target electrode and primary electrons are caused to impinge on this target electrode releasing secondary electrons which are drawn through the apertures in the grid and focussed onto a further target electrode or a mosaic or fluorescent screen. In order to assist in drawing the secondary electrons through the grid 3 a further grid 4 is provided the wires of which are arranged in alignment with the wires of the grid 3 and in proximity thereto, but spaced therefrom, the grid 4 being maintained at a positive potential, for example, of about 100 volts with respect to the grid 3. In the arrangement shown, the grid 3 is composed of wires or bars of a substantially triangular section, the apices of the wires or bars projecting towards the incident primary electrons, the bases of the wires being arranged in the same plane, the wires of the grid 4 being disposed behind the bases as shown. The wires or bars of the grid 3 are disposed parallel to one another and may be strengthened at intervals along their lengths by transversely extending bracing bars of comparatively small cross-section. The shadow ratio of the grid 3 is large; for example, the spaces between the wires being approximately $\frac{1}{10}$th of the pitch of the wires. As stated above, difficulties arise in the construction of and in the mounting of the two grids shown in Figure 1, but these difficulties are avoided by the use of the grid structure in accordance with the invention as shown in Figure 2. In this figure the grid wires 5, which form the grid 3 of Figure 1, are of substantially the same cross-section and onto the flat bases of the wires 5 a layer of insulating material is preferably evaporated thereon as indicated at 6, the insulating material being, for example, lithium borate or sodium fluoride. The evaporated stream of insulating material is applied so that it coats only the flat bases of the wires 5 and after the coating of insulating material is applied a layer 7 of a suitable metal or conducting material is applied to the insulating material 6, preferably by evaporation, or it may be otherwise applied in a fractional state, as by cathode sputtering. The resultant structure is thus a pair of conducting grids separated by the insulation 6, both grids being maintained in alignment. Suitable contacts can then be applied to the two conducting grids so that the necessary potentials can be applied thereto when in operation. The insulated layer may be deposited in any other suitable way. For example, a finely ground enamel powder may be settled or sprayed onto one side of the mesh after which the whole is heated to fuse the enamel and cause it to form a coherent insulating coating.

When the conducting layer 7 is to function as a mosaic screen the layer may be silver and after application of the layer it may be heated in order to cause the silver to aggregate in minute globules which may then be photo-sensitised in known manner so that a photo-electrically sensitive mosaic screen is formed on the rear of the grid constituted by the wires 5. If desired, the coating of conducting material may be applied in a sufficiently thin layer in accordance with the specification of the United States patent to Freeman No. 2,222,940, issued on November 26, 1940, so as to form a mosaic screen without heating the metal to aggregate it into minute globules.

The cross-section of the wires 5 may be other than that shown in Figure 2, for example, they may be of a circular, rectangular or other suitable cross-section. Also the grid may be of the mesh kind comprising interwoven wires or of any other suitable kind such as one produced by electro-deposition. The fineness of the grid constituted by the wires 5 does not present a great difficulty during manufacture of the composite grids since by evaporating both the layers of insulating and conducting materials these layers can be caused to conform to the configuration of the surface of the grid to which they are applied. The present invention enables grids of relatively large area, for example, 5″ x 4″, to be readily constructed, and since the grid in accordance with the invention is of a composite character the difficulties which arise in mounting the grids in alignment are avoided, the composite grid also facilitating mounting within the envelope of an electron discharge device.

The invention is not limited in its application to the types of devices referred to above, since it may be used in any suitable device where found desirable.

I claim:

1. An electrode structure for use in an electron discharge device comprising a first electrically conducting grid or mesh of high secondary electron emissive material, a layer of insulation on one side of the mesh, a second grid or mesh of conducting material secured to the insulation so that the interstices of the meshes are in alignment and will permit the passage therethrough of electrons, said second grid being adapted to be maintained at a positive potential with respect to said first grid whereby the secondary electrons emitted from said first grid may be directed and accelerated through the interstices of the meshes.

2. An electrode structure for use in an electron discharge device comprising a first electrically conducting plate of high secondary electron emissive material, said plate having a plurality of perforations thereon, a layer of insulation on one side of said plate, a second perforated plate of conducting material secured to the insulation so that the perforations in the plates are in alignment and will permit the transmission of electrons therethrough, said second plate being adapted to be maintained at a positive potential with respect to said first plate whereby the secondary electrons produced at said first plate may be directed and accelerated through the perforations in the plates.

JAMES DWYER McGEE.